(12) United States Patent
Harkensee et al.

(10) Patent No.: US 8,209,198 B2
(45) Date of Patent: *Jun. 26, 2012

(54) METHODS FOR SELLING INSURANCE USING HYBRID LIFE

(75) Inventors: James Harkensee, Arlington Heights, IL (US); Richard A. Hemmings, Glenview, IL (US)

(73) Assignee: Fidelity Life Association, Oak Brook, IL (US)

( * ) Notice: Subject to any disclaimer, the term of this patent is extended or adjusted under 35 U.S.C. 154(b) by 595 days.

This patent is subject to a terminal disclaimer.

(21) Appl. No.: 12/013,959

(22) Filed: Jan. 14, 2008

(65) Prior Publication Data

US 2009/0182583 A1    Jul. 16, 2009

(51) Int. Cl.
*G06Q 40/00* (2012.01)
(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 2002/0165740 A1* | 11/2002 | Saunders | 705/4 |
| 2003/0074233 A1* | 4/2003 | Lee | 705/4 |
| 2003/0208385 A1* | 11/2003 | Zander et al. | 705/4 |
| 2004/0181435 A9* | 9/2004 | Snell et al. | 705/4 |
| 2004/0236612 A1* | 11/2004 | Heusinkveld et al. | 705/4 |
| 2007/0021987 A1* | 1/2007 | Binns et al. | 705/4 |
| 2007/0094053 A1* | 4/2007 | Samuels | 705/4 |
| 2008/0082370 A1* | 4/2008 | Collins et al. | 705/4 |

FOREIGN PATENT DOCUMENTS

EP    1351177    * 11/2002

OTHER PUBLICATIONS

Mass Mutual rewards wellness in new whole life product. Best's Review / Life-Health Insurance Edition; May 1994, vol. 95 Issue 1, p. 80.*
"Life Underwriting Requirements Guide", ING North America Insurance Corporation, Jan. 2009.

* cited by examiner

*Primary Examiner* — Charles Kyle
*Assistant Examiner* — Robert Niquette
(74) *Attorney, Agent, or Firm* — K&L Gates LLP

(57) ABSTRACT

An insurer sells a life insurance policy with two distinct coverage periods. Prior to accepting the offer of insurance, the insurer underwrites the insurance contract on a limited basis using information obtainable by querying a remote database. During the first coverage period, full coverage is provided and the premium rates approximate a comprehensively underwritten risk. The value of coverage provided at the end of the first coverage period may be reduced if the insured fails to satisfy various obligations. If before a contractually defined compliance period the insured undergoes medical tests and submits blood, urine, or other tissue samples to an underwriter or approved laboratory, the underwriter comprehensively underwrites the policy. If the comprehensive underwriting is satisfactory, the insurance contract is amended, modified, or replaced with a new contract effectively extending full coverage for a longer, extended coverage period, while maintaining or even reducing the premiums owed.

20 Claims, 2 Drawing Sheets

METHODS FOR SELLING INSURANCE USING HYBRID LIFE

TECHNICAL FIELD

The present disclosure relates in general to life insurance, and in particular to methods for selling life insurance, so that full coverage begins before the policy is comprehensively underwritten based on a full medical examination.

BACKGROUND

When a person purchases a life insurance policy from an insurance company, the insurance company agrees to provide a benefit to one or more designated beneficiaries upon the occurrence of an insured event. The insurance company and the policy owner enter into a contract, whereby the insurance company agrees to pay a sum of money (the benefit) upon the insured's death (the insured event). In exchange, the policy owner agrees to pay fees at regular intervals (the premiums) in amounts determined based on the insurance company's classification of the individual within its risk classification system. A life insurance policy is typically purchased by or on behalf of an individual to be insured, and upon purchasing the policy the purchaser designates one or more individuals or entities (the beneficiaries) to receive the benefit under the policy if and when an insured event occurs. Typically, the policy owner begins paying premiums coincident to commencement of coverage under the policy.

Sellers of life insurance policies face countervailing concerns when determining who to insure, how much to charge for coverage and the amount of coverage to provide. On one hand, offering customers large benefits at low premiums is a major selling point, and maximizes the number of insurance policies sold. On the other hand, insurance companies expose themselves to a great deal of risk with each insurance policy sold. As an example, if an insurance company sells a policy with a benefit amount of $500,000.00 and monthly premiums of $1,000.00, more than 40 years will elapse before the sum of the premiums received by the insurance company exceeds the benefit amount. If an insured event occurs early in the policy's term (e.g., the insured dies), for instance in the first five years, the insurance company is contractually obligated to distribute a large sum of money after having received only a small sum from premium payments. Insurance companies can mitigate this risk somewhat by increasing premiums, but doing so severely deters potential purchasers of insurance policies.

As a result of the risk inherent in selling life insurance policies, the goal of any life insurance company is to accurately predict the mortality rates of classes of individuals. Life insurance companies define classes based on risk factors, predict mortality rates for each class, and attempt to accurately classify prospective insureds based upon factors believed to be related to life expectancy. To ensure accurate classification of each prospective insured, each policy is underwritten based on predetermined risk factors such as age, sex, family medical history, the medical history and current health of the individual, motor vehicle records (MVRs), and other pertinent information. Accurate underwriting requires accurate assessment of risk factors, accurate classification of prospective insureds, and, assuming accurate prediction of mortality rates, enables successful mitigation and spreading of risk.

Life insurance policies are generally underwritten on either a limited or a comprehensive basis. Limited underwriting typically involves asking the prospective insured a series of questions about his or her medical history and perhaps searching various remote databases to determine information about the prospective insured, such as age, domicile, prescription medication taken, and criminal and driving history. Comprehensive underwriting typically involves analyzing the results of a series of medical tests and review of attending physician records to verify the answers to a series of questions about the health history of the prospective insured. The prospective insured is usually required to provide blood, urine, or other tissue samples to be tested by a laboratory or other medical professional, and the results are submitted to an underwriter. Based on the results of the medical tests and the prospective insured's answers to the questions, the insurance company classifies the risk associated with the prospective insured by placing them in predefined classes. The insurer then sets the premiums and benefit amount according to the mortality rates associated with the appropriate classes.

Requiring prospective insureds to undergo extensive medical testing before receiving insurance coverage is a major deterrent to the potential sale of an insurance contract. Besides being deterred by the physical invasiveness inherent in the comprehensive underwriting procedure, prospective insureds often hope to obtain coverage for the full desired amount immediately upon applying for an insurance contract, and always hope to pay a reasonable rate for coverage. Life insurance companies, on the other hand, hope to sell as many policies as possible but also hope to manage risk by not providing coverage without reasonably thorough underwriting, a process that usually takes weeks or even months to complete.

In response to these concerns, methods of selling insurance involving a range of less than comprehensive underwriting have evolved. This range is defined by striking different balances between the invasiveness of the underwriting and the price paid for initial coverage. Generally, a consumer is provided some amount of coverage immediately upon acceptance by the insurance company of application and payment of a first premium. Both the amount of coverage and the premiums vary, however, based on whether the insured is covered by a simplified issue policy or some form of temporary insurance.

Some insurance companies issue so-called "simplified issue" insurance policies, typically in response to applications with just five or six questions about the health of the prospective insured. A simplified issue policy provides coverage following the insured's representations in the application and payment of the first premium, with coverage beginning upon the insurer's acceptance of the application for insurance. Simplified issue policies are initially underwritten on a limited basis by asking the prospective insured a short series of questions about the medical history and current health of the prospective insured. However, such policies still represent a great deal of risk to an insurer because there is little opportunity to verify the prospective insured's responses to the questions or determine health conditions or other pertinent risk information beyond the few questions answered by the applicant. To mitigate this risk, insurers typically charge relatively high premiums for simplified issue coverage and may void the coverage if false answers were provided and death occurs during the policy's contestable period (usually two years).

Insurance companies also sell products providing limited duration life insurance coverage. This limited duration coverage provides coverage for only a limited time, and typically provides coverage after the insured risk has been underwritten on only a limited basis. Agreements defining such limited coverage typically include limitations on the period of coverage, the face amount available to a beneficiary, and/or the conditions imposed by the insurer.

One common example of limited duration insurance coverage is coverage provided by agreements known as temporary insurance agreements. When it sells a temporary insurance agreement, an insurer usually agrees to provide insurance coverage for a specified, limited period of time. Typically, this period of time begins to run on the date on which the insurer receives the application and accepts the initial premium. When the specified, limited period of time expires, the insurer is typically no longer under any obligation to provide coverage of an insured's life under the temporary insurance agreement. Because of the risk inherent in insuring minimally underwritten risks, temporary insurance agreements typically are relatively expensive, provide relatively small benefit amounts, and provide coverage for a relatively short period of time.

Another common example of limited duration insurance coverage is a type of coverage known as conditional receipt coverage. When an applicant receives conditional receipt coverage, the insurance company provides the applicant with a premium receipt which makes the insurance effective only if or when specified conditions are met (e.g. the proposed insured's medical history is as was represented on the application, such that the insurance company issues the policy as applied for). Conditional receipt coverage may be viewed as a subset of limited duration life insurance coverage because along with the premium receipt, the insurance company may provide a benefit in the event of death of the prospective insured before the policy is issued only if the insured's health at the time of death is determined to have been as represented on the application such that the company would have issued coverage as applied for, in accordance with its normal underwriting guidelines. Conditional receipt coverage does not guarantee full coverage until the insured has submitted results of a full battery of medical tests sufficient to enable comprehensive underwriting. Instead, the prospective insured receives conditional coverage between the time the offer of insurance is submitted and the time the underwriter is satisfied by the comprehensive underwriting and the applicant is accepted. Consideration paid for conditional receipt coverage is typically low—during the coverage period before satisfactory comprehensive underwriting, the low premiums reflect the limited coverage. During the period after comprehensive underwriting, the low premiums reflect a coverage amount equal to the insured's full desired coverage amount provided only after satisfactory completion of comprehensive medical underwriting. Because the comprehensive underwriting assures the insurer of the health of the prospective insured, more accurate classification is possible and the insurer can charge lower premiums due to the relatively lesser risk presented by the fully underwritten policy. Satisfaction of the requisite comprehensive medical underwriting, however, requires action on the part of the insured. The insured must submit to an extensive medical examination administered by a qualified physician, a paramedical examiner, or an approved laboratory, and often must submit blood, urine, or other tissue for analysis by a laboratory or other medical professional.

There are downsides to the above methods of selling life insurance. Simplified issue insurance, while providing immediate and unconditional coverage, is very expensive to maintain and therefore is not a viable option to many consumers. Temporary insurance agreements, while typically easier to obtain due to the lack of comprehensive medical underwriting, are limited in duration and typically do not satisfy an insured's long-term life insurance needs. Additionally, temporary insurance agreements may be relatively expensive and may provide relatively lower benefit amounts. Conditional receipt coverage, while more affordable, requires that individuals submit to a much more rigorous medical testing regimen before complete coverage is provided. If the medical testing is not performed soon after applying for the policy, the policy will not be issued and any temporary coverage will lapse after a short period. Because many potential insureds fail to obtain the required tests in a timely fashion, many who apply for policies never become insured as planned. Even among those who do submit to the required testing, the results of the medical tests may result in the discovery of risk factors that cause the insurer to classify prospective insureds such that premiums are so high as to be unaffordable, or result in the insurer making counter offers for higher premiums or lesser amounts of insurance.

SUMMARY

In the method described herein, an insurer sells a life insurance policy with a term divided into two distinct coverage periods. Preferably, prior to accepting the offer of insurance, the insurer reviews the information provided on the application and underwrites the insurance contract on a limited basis using information obtainable by performing database queries, such as information about the prescription drugs an individual takes or has taken, an individual's driving and criminal record, medical and non-medical information provided by the Medical Information Bureau, and/or other suitable information obtainable by performing database queries. During the first coverage period, coverage in the insured's full desired coverage amount is provided and the premium rates or other consideration required by the contract approximate a fully underwritten risk, despite the fact that the policy or agreement has only been underwritten on a limited basis. The only obstacle to an insured receiving coverage for the first coverage period is the limited underwriting. Absent satisfactory completion of comprehensive medical underwriting, at the expiration of the first coverage period, the insurance contract provides that the premiums or other consideration owed become annually increasing premiums due under annual renewable term (A.R.T.) coverage. Such A.R.T. policies typically require significantly increased premiums to maintain the same level of coverage, which will continue for the remainder of the policy period unless the insured submits to medical underwriting within the period specified by the insurer during the contestable period (i.e., up to two years) and qualifies based on medical underwriting for the rates anticipated at the time of application.

If the insured undergoes medical tests and/or submits blood, urine, or other tissue samples to an appropriate laboratory facility sometime during the first coverage period, an underwriter uses the results to comprehensively underwrite the policy. If the results of the comprehensive underwriting are satisfactory, the insurance contract is amended, modified, or replaced with a new contract so as to effectively extend the period during which coverage in the insured's full desired coverage amount is provided from the first coverage period to a longer, extended coverage period. Moreover, the premium amounts or other consideration owed may remain substantially unchanged for the extended coverage period. At the expiration of the extended coverage period requested by the policy owner at the time of application (e.g. after level premium periods of 10, 20, or 30 years), the policy converts to an A.R.T. policy with annually increasing premiums to some advanced age (e.g. age 95) when coverage would not be renewable. The extended coverage period as amended, modified, or replaced preferably extends the total length of the coverage period providing the insured with his or her full desired coverage amount to a level premium duration competitive with traditional level term life insurance policies that are offered by many companies in the market with conditional receipt coverage. Similarly, the premiums or other consideration required for coverage in the insured's full desired coverage amount during the extended coverage period are preferably competitive with the premiums owed for typical conditional receipt coverage.

If the insured submits to the required medical testing but the underwriting indicates an unsatisfactory risk, the contract is not amended, modified, or replaced, and the insured is given the option to instead continue coverage beyond the first coverage period under the existing policy by paying the renewal fees required for the A.R.T. portion of the policy. Alternatively, the insurer makes a counter offer for a policy based on the insured's health as determined by the medical underwriting.

Selling insurance policies of this type enables the insurer to mitigate its risk but offer the consumer a competitively priced product that can be issued within a very short period of time. Moreover, the prospective insured is provided coverage in the prospective insured's full desired coverage amount pending only satisfaction of limited underwriting. Often, this enables the prospective insured to obtain coverage the within a short time after filling out an application for insurance. Further, though the insurance company puts the onus on the insured to ensure continuous coverage by submitting the required medical information and material from medical providers selected by the insured, the insured still has an option to continue coverage beyond the first coverage period, even without submitting to a full battery of medical tests.

In one embodiment, the first coverage period is two years and the extended coverage period extends the total length of level premium coverage to 20 years. The extended coverage period may alternatively extend the total length of level premium coverage to a duration other than 20 years, as selected by the policy owner. The insured may have two years in which to undergo the medical tests and procedures as required by the insurance company, and submit the results of the tests, information, and any required blood, urine, or other tissue samples to a laboratory for analysis. If the insured submits the required materials sooner than is required by the insurance contract (e.g. within six months), additional incentives may apply (e.g. premium rebates, reduced premiums, and/or an increased benefit).

In a further embodiment, the insured may undergo testing performed by any qualified physician of the insured's choice, including the insured's personal physician. This provides the insured with more convenience and the ability to schedule the examination for the insurance company to coincide with a regularly scheduled physician visit over the two-year period. Alternatively, the insured may submit to a paramedical examination performed by an appropriate paramedical examiner or may submit material to an approved laboratory.

Additional features and advantages are described herein, and will be apparent from, the following Detailed Description and the figures.

DETAILED DESCRIPTION OF EXEMPLARY EMBODIMENTS

Figure 1:
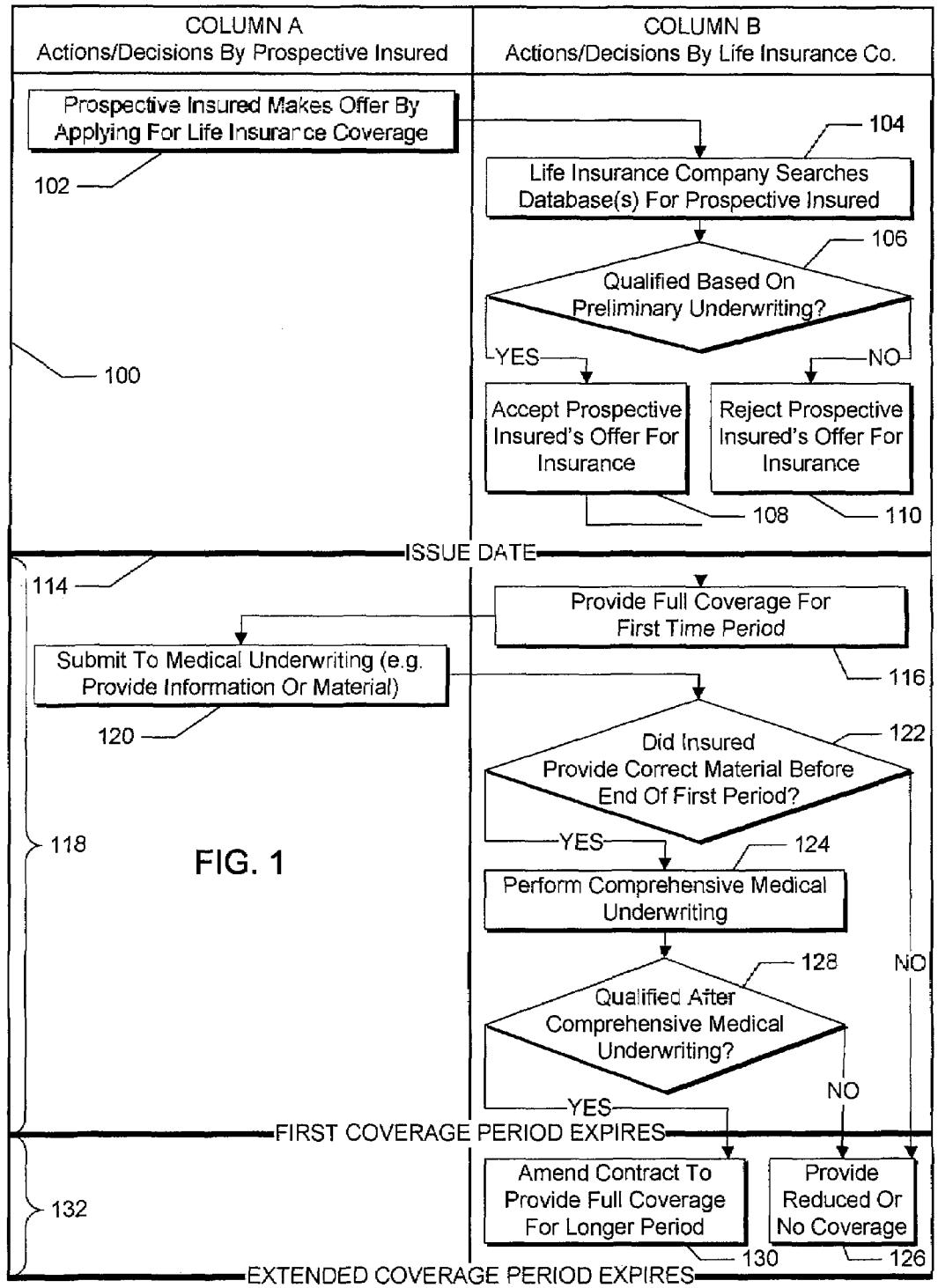
FIG. 1 is a flowchart of an example method of selling life insurance.

FIG. 1 contains a flow chart 100 of an example life insurance policy sales transaction. In FIG. 1, actions taken and decisions made by a prospective insured (purchaser) are included in Column A, and actions taken and decisions made by a life insurance company (seller) are included in Column B. Although the example life insurance sales transaction 100 is described with reference to the flow chart illustrated in FIG. 1, it will be appreciated that many other methods of selling life insurance are contemplated. For example, the order of many of the blocks may be changed, and many of the blocks described are optional.

As illustrated in FIG. 1, the prospective insured makes an offer for a life insurance policy by submitting an application (block 102). Typically, making this offer includes filling out an application for life insurance, answering questions about the prospective insured's medical history, and paying the first of any premiums due. The life insurance company searches at least one database for information about the prospective insured to underwrite the potential policy on a limited basis (block 104). For example, the insurance company may search a pharmaceutical database containing a listing of all prescription medication taken by the prospective insured, a department of motor vehicles database listing any traffic violations committed by the prospective insured, or a Medical Information Bureau database containing medical health reports about the prospective insured. The insurance company searches these databases to underwrite the eventual insurance policy on a limited basis; the database searches enable the insurer to verify the information provided in the prospective insured's application. Based on the results of the database search, the insurer assesses a number of risk factors such as age, domicile, prescription medication taken, and criminal and driving history, and places the prospective insured in one of a set of predetermined risk classes.

If the limited underwriting qualifies the individual based on a predetermined set of preliminary qualification parameters (block 106), the insurance company accepts the prospective insured's application for insurance (block 108). The premiums or other consideration required of the prospective insured may be lower in price than would be available to an insured purchasing a simplified issue insurance policy with a similar benefit. In this example, the premium amounts or other consideration may be higher than the premiums would be for a traditional policy offered with temporary conditional receipt coverage with an identical benefit amount, as the policy has not yet been comprehensively medically underwritten. If the limited underwriting disqualifies the prospective insured based on the predetermined set of limited qualification parameters, the insurance company rejects the prospective insured's offer for insurance and does not provide coverage (block 110).

Referring still to FIG. 1, as soon as the insurance company accepts the prospective insured's offer for insurance, coverage under the policy or agreement begins. The date of acceptance of the prospective insured's application is known as the "issue date" of the insurance policy, represented by line 114. The insurance company provides coverage beginning on the issue date 114 and continuing through the first coverage period 118 (block 116). If, during the first coverage period 118, the insured satisfies all his or her obligations under the policy and an insured event occurs (e.g. the insured dies), the insurance company is contractually bound to pay the benefit to the designated beneficiaries.

The first coverage period 118 may be two years. Alternatively, the first coverage period 118 may be fixed for all prospective insureds at a length of time different than two years. The first coverage period 118 may vary from prospective insured to prospective insured depending on the results of an initial database query and the limited underwriting.

Sometime during the first coverage period 118, the insured has the option to submit to comprehensive medical underwriting by providing additional information and/or material to the insurer, an underwriter, an approved laboratory, or another appropriate entity (block 120). The information or material provided enables the insurer, an underwriter, or other entity to comprehensively medically underwrite the policy. For example, the insured may obtain medical testing and may have blood, urine, or other tissue samples taken by a qualified physician of the insured's choice to satisfy the comprehensive medical underwriting requirements. In this example, the insured receives the benefit of scheduling the medical consultation when it is convenient, and with a qualified physician with whom the insured feels comfortable. Alternatively, the insured may submit to a paramedical examination performed by an appropriate paramedical examiner or may choose to provide blood, urine, or other tissue samples directly to an approved laboratory. The comprehensive underwriting requirements may mandate that the insured undergo tests, provide blood, urine, and/or other tissue samples, or any combination thereof. In one example embodiment, satisfying the comprehensive underwriting requirement may be done at the insured's own expense. Alternatively, the insurance company may be responsible for some or all of the cost of satisfying such comprehensive underwriting requirements. The insurer itself may not perform the comprehensive underwriting. For example, the insured may be required to submit information, test results, and/or other material sufficient to enable some other party to comprehensively medically underwrite the policy.

The insured may be required to provide any information, test results, and/or material to the appropriate party within a contractually determined compliance period before the expiration of the first coverage period 118. For example, the insurance contract may obligate the insured to provide the required information, test results, and/or material to the appropriate party before the end of the period of contestability of the insurance policy or insurance agreement. The period of contestability may differ from the first coverage period 118. The contestability period of a given policy or agreement may be two years; the insured may be required to provide any information, test results, or material before the end of this two year period. Alternatively, the insured may be required to provide any test results, information, and/or before a date not corresponding to the end of the contestable period. For example, the period of contestability may be two years, which may be different from the length of the first coverage period 118, but the insured may be required to provide test results, information, and/or other material within six months of the insurance company's acceptance of the insured's offer of insurance.

If the insured provides the correct additional information, test results, and/or other material before expiration of the contractually-indicated compliance period (block 122), the life insurance company, an underwriter, or another entity performs a comprehensive medical underwriting of the insurance policy (block 124). This comprehensive underwriting may involve further testing of blood, urine, and/or other tissue samples submitted to the underwriter, verification of the answers to questions in the original application for insurance based on the results of certain medical tests, and/or further classification of risk based on additional information provided by the insured. In some embodiments, the comprehensive underwriting may involve querying one or more remote databases to determine additional information about the prospective insured. Moreover, the comprehensive underwriting may be performed cooperatively by a number of different entities. For example, the insurance company, an underwriter, and/or an independent laboratory may perform a portion of the comprehensive underwriting. If the insured submits the information, test results, and/or other material before a certain date (e.g. within six months of the issue date), additional incentives may apply (e.g. further reduced premiums and/or an increased benefit).

If the information, test results, and/or other materials provided to the insurance company, underwriter, or other entity was not the full required set of information, test results, and/or other materials, or if the information, test results, and/or other materials were not provided to the proper entity before the expiration of the contractually determined compliance period (block 122), the insurance company provides coverage for the insured's full desired coverage amount for any remainder of the first coverage period 118. Upon expiration of the first coverage period 118, however, the insurance company provides reduced or no coverage to the insured for the remainder of the extended coverage period (block 126). For example, the insurance company may provide an A.R.T. policy to the insured with annually increasing premiums that extends beyond the end of the first coverage period 118. This A.R.T. policy may be available to the insured until the insured reaches a predetermined age—for example, until the insured is 95 years old. In other embodiments, the insurance company may provide coverage beyond the first coverage period 118 in the form of an accidental death only policy or any other suitable policy providing the reduced coverage.

If, after comprehensive medical underwriting, the insured is qualified to receive the insured's full desired coverage amount at the same initial rate charged during the first coverage period 118 (block 128), the insurance company in a preferred embodiment continues to provide the same amount of coverage for the duration of the first coverage period 118, requiring the same premiums or other consideration. In the preferred embodiment, after the expiration of the first coverage period 118, the insurance company may amend, modify, or replace the insurance contract in order to obligate the company to continue providing the same level of coverage at the same premium rate for an extended coverage period 132 (block 130). In alternative embodiments, the results of the comprehensive medical underwriting may indicate that the insured is a better risk than indicated by the application and the initial, limited underwriting. In such embodiments, the insurance company may amend, modify, or replace the insurance contract such that the insured either receives a higher level of coverage for the same premium rate during the second coverage period 132, or such that the insured receives the same level of coverage but pays a reduced premium rate for the extended coverage period 132. In the preferred embodiment, subject to satisfactory completion of medical underwriting, the premiums or other consideration owed during the extended coverage period 132 are equivalent or substantially equivalent to the premiums owed during the first coverage period. Moreover, the level of coverage provided during the extended coverage period 132 is equivalent to or higher than the level of coverage provided during the first coverage period 118. It should be appreciated that in some embodiments, if the insured submits the required information, test results, and/or other materials and the comprehensive medical underwriting is performed before the end of the first coverage period 118, the insurance company may amend, modify, or replace the insurance contract to provide higher-value coverage before the end of the first coverage period 118. Thus, the methods disclosed encourage an insured to submit the required information, test results, and/or other materials as soon after the issue date 114 as possible.

If the insured is not qualified after comprehensive medical underwriting is performed (i.e. the results of the comprehensive medical underwriting are unsatisfactory) (block 128), the insurance contract is either not amended, modified, or replaced, and expires after the first coverage period 118, or is amended, modified, or replaced so as to provide reduced coverage for the extended coverage period 132 (block 126). Alternatively, the insurance company may make an alternative offer of insurance to the insured if the results of the comprehensive medical underwriting are unsatisfactory. For example, the insurance company may amend, modify, or replace the insurance contract to provide A.R.T. coverage, accidental death only coverage, or any other suitable type of reduced coverage, as discussed above.

The value of coverage period provided during the extended coverage period 132 may be reduced if the insured fails to provide required information and/or material, or if the results of the underwriting performed are unsatisfactory. For example, the insured may be allowed to continue paying premiums and may continue to receive coverage throughout the extended coverage period 132. In this example, the contract may be amended, modified, or replaced to provide for less coverage, higher premiums, or a combination of the two. The insured may be given the option to pay premiums similar to the premiums or other consideration associated with a simplified issue policy for the extended coverage period 132, and the beneficiaries may still be entitled to the same benefit to which they were entitled during the first coverage period 118. Alternatively, the insured may be given the option of paying substantially the same or reduced premiums but receiving reduced coverage. For example, if the results of the comprehensive medical underwriting are unsatisfactory, the policy may automatically convert from providing coverage for the insured's full desired coverage amount during the first coverage period 118 to providing accidental-death-only coverage during the extended coverage period 132. In this embodiment, the beneficiaries may only receive the benefit of the insurance policy or agreement during the extended coverage period 132 if the insured dies as a result of an accident.

In another example, the policy may convert to an Annual Renewable Term (A.R.T.) policy during the extended coverage period 132 if the submitted information and material fails to satisfy comprehensive medical underwriting. The insured may pay an annual, increasing renewal fee, but retain the same level of coverage (i.e., the same benefit amount and the same insured events) as was provided before the unsatisfactory comprehensive underwriting. The option to treat the policy as an A.R.T. policy may expire when the insured reaches a certain age. For example, the insured may retain the option to pay an annual renewal fee each year until the insured reaches 95 years of age.

In one embodiment, the sum of the first term and the extended term of coverage with level premiums is 20 years. In another embodiment, the extended term of coverage is 10, 15, 20, 25, 30, 35, or some other number of years. The total term of coverage for the insured's full desired coverage amount may be equivalent or substantially equivalent to the period of coverage provided in similar conditional receipt coverage agreements.

In another embodiment, if the insured satisfies the requirements for submitting information and material but fails the comprehensive medical underwriting, the insurer does not extend coverage to the extended coverage period 132. The insurance company may decline to extend coverage but may make a counter-offer to the insured with a different level of coverage and different premiums. If the initial compliance period has not expired the insured may be given the opportunity to change the insured's health habits and undergo another round of testing and sample gathering. In this embodiment, the insured may submit the second set of materials to the insurer, underwriter, and/or appropriate medial laboratory for re-evaluation. If this second submission generates satisfactory results of the comprehensive underwriting, the initial period of providing coverage for the insured's full desired coverage amount may be extended as described above.

Figure 2:
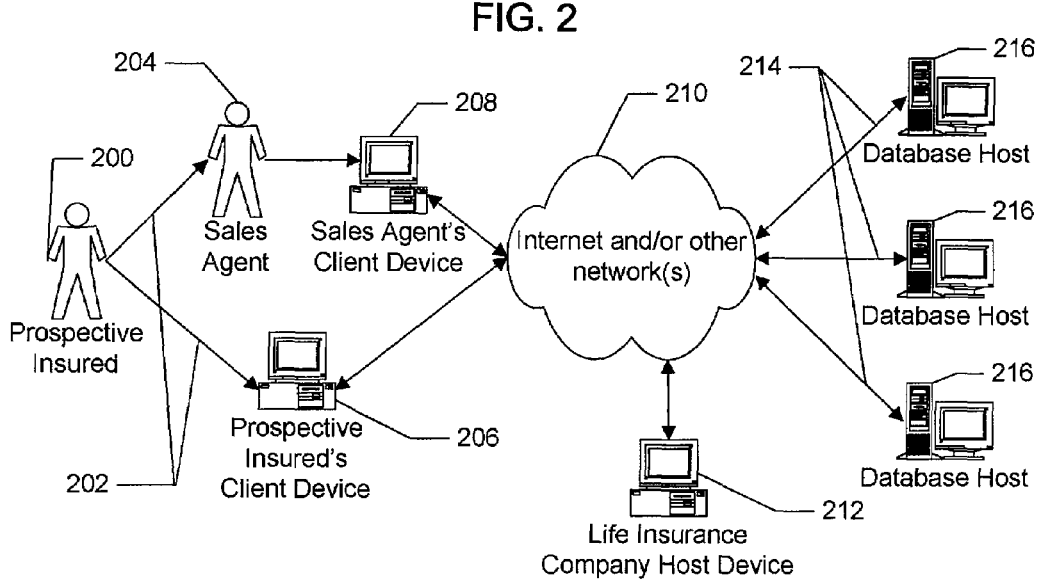
FIG. 2 is a block diagram indicating two example implementations of the method of selling life insurance.

FIG. 2 illustrates two examples of alternative implementations of the method of selling insurance disclosed herein. The prospective insured 200 sends an insurance application 202, which constitutes an offer to purchase insurance, to an insurance sales agent 204 or directly to the life insurance company host device 212 by way of the prospective insured's client device 206. It should be appreciated that in some embodiments, a proposed owner of a policy insuring the life of a prospective insured who is not the owner of the policy may apply for and purchase a life insurance policy, usually with the consent of the insured. If the prospective insured 200 submits an application for insurance directly to a sales agent 204, sales agent 204 uses the agent's client device 208 to access a network, such as the Internet and/or some other network 210, which enables the agent 204 to send the application to the appropriate the life insurance company host device 212. Similarly, if the prospective insured 200 submits an application for insurance 202 directly to insurance company with the prospective insured's client device 206, the prospective insured's client device 206 sends the application for insurance by way of the Internet and/or some other network 210 directly to the life insurance company host device 212.

As further illustrated by FIG. 2, the life insurance company host device 212 sends a query to a database host 216 and receives a query response 214 over the Internet and/or some other network 210. In different embodiments, the databases searched to perform the limited underwriting include one or more of a pharmaceutical database, a department of motor vehicles database, a database of medical and non-medical information provided by the Medical Information Bureau, or some other suitable database. The life insurance company host device 212 receives the query response 214, and based on the query response 214 determines whether to accept the prospective insured's 200 offer for an insurance policy 202.

If the life insurance company host device 212 decides to accept the prospective insured's 200 offer 202, the life insurance company host device 212 may also generate the policy resulting from acceptance of the application. The life insurance company host device 212 then sends the policy either to the prospective insured's 200 client device 206 or to the sales agent's client device 208, depending on how the life insurance company host device 212 received the quote request. If the insurance company host device decides to accept the prospective insured's 200 offer 202, an issue date 114 is established and the insurance company begins to provide coverage for a first coverage period 118. The prospective insured 200 is then provided coverage for the prospective insured's full desired coverage amount in exchange for relatively low premiums or relatively small consideration for the first coverage period 118. The coverage provided and the premiums charged may be comparable to the coverage provided and the premiums charged for conditional receipt coverage with a similar benefit.

Figure 3:
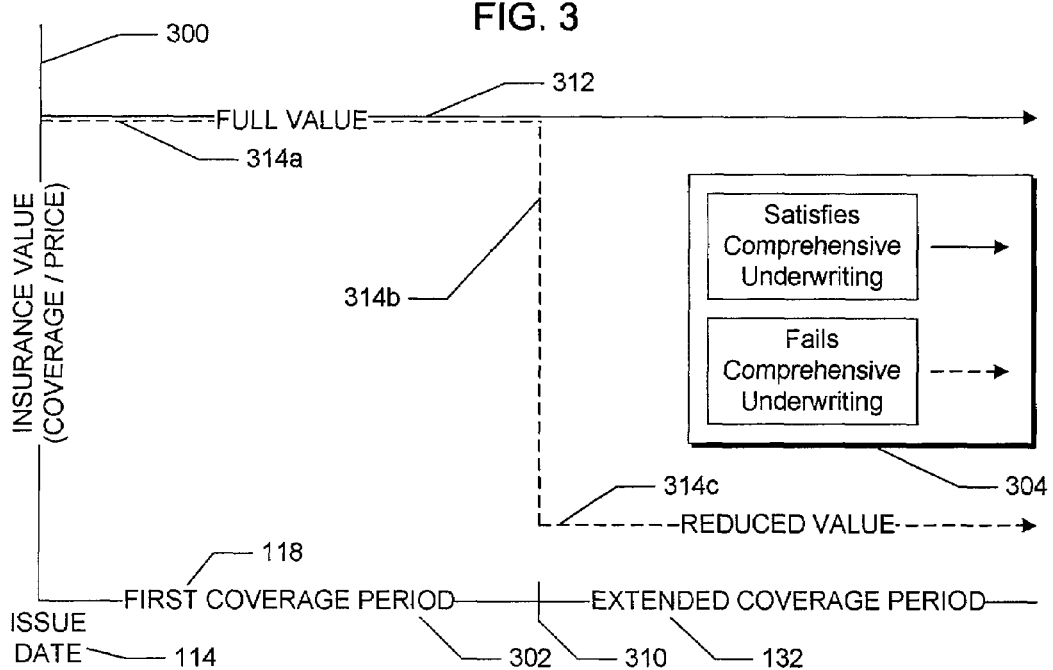
FIG. 3 is a graph, displaying an example of the value of insurance provided over time for one insured that satisfied the comprehensive underwriting requirements and one that did not submit the required test results, blood, urine, or tissue samples to the underwriter.

FIG. 3 illustrates an example of the change in the value of insurance coverage that can result from failure by an insured to submit required medical information or material before the end of the first coverage period 118, or from submitting information that results in unsatisfactory comprehensive underwriting of the insurance policy. The y-axis 300 of FIG. 3 represents the value of insurance coverage provided, calculated as a coverage level divided by a price (e.g. a premium rate or other consideration amount). The x-axis 302 represents time, beginning with the issue date 114 and continuing through the duration of the insurance policy or agreement. Specifically, the x-axis 302 includes the issue date 114, first coverage period 118, and extended coverage period 132.

As indicated by legend 304, solid line 312 represents the value of the insurance coverage provided if the insured 200 submits the required medical information blood, urine, or other tissue samples, by the contractually determined compliance date 310, and the information and materials submitted are sufficient to satisfy comprehensive medical underwriting. The value indicated by solid line 312 remains high throughout both the first coverage period 118 and the extended coverage period 132 because the insured receives the full desired amount of coverage and continues to pay relatively low premiums or other consideration. The premiums or other consideration required do not change, as solid line 312 indicates the value of insurance provided if the insured satisfies comprehensive medical underwriting. This means that the insured has complied with the requirements of comprehensive underwriting by the contractually determined compliance date 310, so the premiums or other consideration owed remain unchanged. It should be appreciated that in alternative embodiments, line 312 is not perfectly straight but rather indicates a slight change of value at the end of the first coverage period 118. This change may result from either a slight increase or decrease in coverage or a slight increase or decrease in premium rate. For example, the value represented by solid line 312 may increase at the end of first coverage period 118, because though the amount of coverage provided to the insured 200 has remained constant, satisfactory completion of comprehensive medical underwriting has caused premiums or other consideration owed to decrease and therefore the overall value of the insurance provided to increase. Additionally, it should be appreciated that the compliance date 310 need not coincide with the end of the first coverage period 118 or the beginning of the extended coverage period 132. Rather, the compliance date 310 must occur at some time before the beginning of the extended coverage period 132. For example, the compliance date need not coincide with the date on which the comprehensive medical underwriting is performed or completed.

As further indicated by legend 304, dashed line 314 indicates the value of the insurance coverage provided if the insured 200 fails to submit the medical information or blood, urine, or other tissue samples by the contractually determined compliance date 310, or if the information and material submitted generate unsatisfactory results of the comprehensive medical underwriting. Referring to dashed line 314, segment 314*a* indicates that an insured 200 receives high value for the insurance during the first coverage period 118. This is because, as described above, if the individual satisfies the limited underwriting requirements, the insurer provides the insured's full desired amount of coverage immediately upon its acceptance of the insurance contract. Segment 314*b* indicates that if the insured 200 fails to provide any required medical information or fails to provide any required medical material (e.g. blood, urine, or other tissue samples) by the contractually determined compliance date 304, or fails the comprehensive medical underwriting, the coverage value drops drastically at the end of the first coverage period 118. Segment 314*c* represents the low value of the insurance coverage the insured 200 receives for the extended coverage period 132 upon failure of comprehensive medical underwriting. This is because, as discussed above, unsatisfactory completion of the comprehensive medical underwriting would result in the insurance company either reducing the amount of coverage provided (e.g. by converting the policy into an A.R.T. policy) or raising the premiums or other consideration owed for the same amount of coverage. In either case, the ratio of the new coverage level to the new premium amount indicates lower insurance value.

In summary, persons of ordinary skill in the art will readily appreciate that methods for selling insurance have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention not be limited by this detailed description of examples, but instead by the claims below.

What is claimed is:

1. A method of providing life insurance, the method comprising:
receiving identification information and underwriting information associated with a person on an application for life insurance covering the person's life;
causing at least one host device to perform at least one database query based on the received identification and based on the received underwriting information to produce a query result;
causing the at least one host device to determine that the person qualifies for life insurance based on the query result;
if the determination is that the person qualifies for life insurance based on the query result:
  (a) providing the life insurance to the person, the life insurance having:
    (i) a first coverage period beginning on a policy issue date and
    (ii) an extended coverage period, the policy issue date and the first coverage period being chronologically prior to the extended coverage period;
  (b) providing life insurance coverage beginning on the policy issue date and continuing through the first coverage period without requiring medical test results associated with the person; and
  (c) if the medical test results associated with the person are (1) satisfactory and (2) are received after the policy issue date and before the end of the first coverage period, altering a value of coverage associated with life insurance coverage provided during the extended coverage period.

2. The method of claim 1, including fully guaranteeing the life insurance regardless of a medical condition associated with the person that is discovered after the life insurance is provided to the person.

3. The method of claim 2, including adjusting a premium amount associated with the life insurance on a going forward only basis after determining the medical condition associated with the person.

4. The method of claim 2, wherein fully guaranteeing the life insurance does not include fully guaranteeing the life insurance if the underwriting information includes intentionally false information.

5. The method of claim 1, including receiving the medical test results from a doctor selected by the person.

6. The method of claim 1, including receiving the medical test results from a medical examination approved by the life insurance provider.

7. The method of claim 1, including receiving the medical test results from an approved laboratory selected by the person.

8. The method of claim 1, wherein the person is given an incentive if the medical test results are provided to the life insurance provider within a predefined period of time after the life insurance is provided to the person.

9. The method of claim 8, wherein the incentive includes reducing a premium amount associated with the life insurance.

10. The method of claim 8, wherein the incentive includes increasing the full coverage amount.

11. The method of claim 8, wherein the incentive includes a cash back amount.

12. The method of claim 1, wherein the life insurance remains the same if the medical test results are not received within a predefined time period after providing the life insurance coverage to the person.

13. The method of claim 1, wherein the life insurance converts to annual renewable term life insurance such that the person may renew the life insurance at the end of each year following the predefined time period by paying an adjusted premium.

14. The method of claim 13, wherein the person may renew the life insurance at the end of each year so long as the person is younger than a predefined age.

15. A method of providing life insurance to a person, the method comprising:
  receiving identification information and underwriting information associated with the person in association with an application for life insurance covering the person's life;
  storing at least a portion of the received identification information and at least a portion of the underwriting information on at least one storage device;
  causing at least one host device to perform at least one database query based on the stored information on the at least one storage device to produce a query result;
  causing the at least one host device to determine that the person qualifies for life insurance based on the query result;
  if the determination is that the person qualifies for life insurance based on the query result:
    (a) providing the life insurance to the person, the life insurance having:
      (i) a first coverage period beginning on a policy issue date and
      (ii) an extended coverage period, the policy issue date and the first coverage period being chronologically prior to the extended coverage period;
    (b) providing life insurance coverage beginning on the policy issue date and continuing through the first coverage period without requiring medical test results associated with the person;
    (c) enabling the person to provide medical test results associated with the person during the first coverage period, and
    (d) if the person provides the medical test results during the first coverage period:
      (i) if the medical test results associated with the person are satisfactory, altering a value of coverage associated with life insurance coverage provided during the extended coverage period, and
      (ii) if the medical test results associated with the person are unsatisfactory, providing said same life insurance coverage to the person during the extended coverage period.

16. The method of claim 15, including adjusting a premium amount associated with the life insurance on a going forward only basis after determining a medical condition associated with the person.

17. The method of claim 15, which includes, if the received medical test results associated with the person are satisfactory but are not received within a predefined time period after providing the life insurance coverage to the person, providing said same life insurance coverage to the person.

18. A method of providing life insurance to a person, the method comprising:
  receiving identification information and underwriting information associated with the person in association with an application for life insurance covering the person's life;
  causing at least one host device to perform at least one database query based on the received identification information or the received underwriting information to produce a query result;
  causing the at least one host device to determine that the person qualifies for life insurance based on the query result;
  if the determination is that the person qualifies for life insurance based on the query result:
    (a) providing the life insurance to the person, the life insurance having:
      (i) a first coverage period beginning on a policy issue date and
      (ii) an extended coverage period, the policy issue date and the first coverage period being chronologically prior to the extended coverage period;
    (b) providing life insurance coverage beginning on the policy issue date and continuing through the first coverage period without requiring medical test results associated with the person;
    (c) enabling the person to provide medical test results associated with the person during the first coverage period, and
    (d) if the person provides the medical test results during the first coverage period:
      (i) if the medical test results associated with the person are satisfactory, altering a value of coverage associated with life insurance coverage provided during the extended coverage period, and
      (ii) if the medical test results associated with the person are unsatisfactory, declining said life insurance coverage to the person during the extended coverage period.

19. The method of claim 18, including adjusting a premium amount associated with the life insurance on a going forward only basis after determining a medical condition associated with the person.

20. The method of claim 18, which includes, if the received medical test results associated with the person are satisfactory but are not received within a predefined time period after providing the life insurance coverage to the person, providing said same life insurance coverage to the person.

* * * * *